US012149105B2

(12) United States Patent
Nibir et al.

(10) Patent No.: US 12,149,105 B2
(45) Date of Patent: Nov. 19, 2024

(54) DISCHARGE CURRENT LIMIT LOOP FOR SHORT CIRCUIT PROTECTION IN REVERSE OPERATION FOR BUCK-BOOST BATTERY CHARGERS

(71) Applicant: Renesas Electronics America Inc., Milpitas, CA (US)

(72) Inventors: Shahriar Jalal Nibir, Apex, NC (US); Yen-Mo Chen, Morrisville, NC (US); Sungkeun Lim, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 676 days.

(21) Appl. No.: 17/502,613

(22) Filed: Oct. 15, 2021

(65) Prior Publication Data
US 2023/0118432 A1   Apr. 20, 2023

(51) Int. Cl.
 *H02J 7/00* (2006.01)
(52) U.S. Cl.
 CPC ...... *H02J 7/00304* (2020.01); *H02J 7/00047* (2020.01); *H02J 7/0068* (2013.01)
(58) Field of Classification Search
 CPC ... H02J 7/00304; H02J 7/00047; H02J 7/0068

USPC .............. 320/103, 128, 135, 136, 140, 152, 320/157–159, 162, 163, 164
See application file for complete search history.

(56) References Cited

U.S. PATENT DOCUMENTS

| | | | |
|---|---|---|---|
| 9,673,638 B2* | 6/2017 | Bastami | H02J 7/00041 |
| 10,530,256 B1* | 1/2020 | Jayaraman | H02M 3/1584 |
| 11,360,150 B2* | 6/2022 | Li | H01M 10/48 |
| 2016/0020621 A1* | 1/2016 | Baby | H02J 7/0047 320/128 |
| 2016/0099593 A1* | 4/2016 | Lim | H02J 7/0068 320/114 |

* cited by examiner

*Primary Examiner* — Richard V Muralidar
(74) *Attorney, Agent, or Firm* — SCULLY, SCOTT, MURPHY & PRESSER, P.C.

(57) ABSTRACT

A method, apparatus and non-transitory computer-readable medium of regulating current within a battery charging circuit. The apparatus including a first current sense resistor configured to sense a first current value at a first port, a second current sensor resistor configured to sense a battery discharge current value output from a battery, and a processor configured to, in response to a short circuit or malfunction at the first current sense resistor, use the battery discharge current value to determine an output current limit and to limit the current at the first port according to the output current limit.

20 Claims, 11 Drawing Sheets

DISCHARGE CURRENT LIMIT LOOP FOR SHORT CIRCUIT PROTECTION IN REVERSE OPERATION FOR BUCK-BOOST BATTERY CHARGERS

TECHNICAL FIELD

The present disclosure relates generally to circuitry and firmware used to supply and receive power, and more particularly to circuitry and software used to manage charging and other power operations.

BACKGROUND

Unless otherwise indicated herein, the materials described in this section are not prior art to the claims in this application and are not admitted to be prior art by inclusion in this section.

Certain configurations of conventional battery charging circuits use a current sense resistor to determine a current being provided to a charging device or another current being provided to the circuit. For instance, a current sense resistor can be used to sense current at an input side of a circuit. In another example, the current sensing circuit can be used to measure current being drawn by a device charging at or otherwise coupled to the battery charging circuit.

In some scenarios, the current sense resistor may be damaged or short circuited. With the current sense resistor inoperative, the circuit can have no way of monitoring and regulating the current proximate an input or output port. A short circuited or damaged current sense resistor can thus result in there being no limit on the output current. The unchecked current resulting from absence of the output current limit can cause damage to components of the battery charging circuit, as well as to an external device charging at the output of the battery charging circuit.

SUMMARY

In some examples, a method of regulating current within a battery charging circuit includes positioning a first current sense resistor within a battery charging circuit, wherein the first current sensor resistor is configured to sense a first current value at a first port, and positioning a second current sense resistor within the battery charging circuit, where the second current sensor resistor is configured to sense a battery charge/discharge current value output from a battery. In response to a short circuit or malfunction at the first current sense resistor, the method may include using the battery discharge current to determine an output current limit, and may limit the current at the first port according to the output current limit.

According to a particular embodiment, an apparatus includes a first sense resistor configured to sense a first current value at a first port and a second current sensor resistor configured to sense a battery discharge current value output from a battery. A processor may be configured to, in response to a short circuit or malfunction at the first current sense resistor, use the battery discharge current to determine an output current limit and to limit the current at the first port according to the output current limit.

According to another particular embodiment, non-transitory computer-readable medium comprising instruction that, in response to execution of the instructions by a processor, cause the processor to perform the following operations: receive an indication that a short circuit or malfunction has occurred at a first current sense resistor of a circuit, determine a battery discharge current value output from a second current sensor resistor is configured to sense the battery discharge current value output from a battery, and in response to a short circuit or malfunction, to use the battery discharge current value to limit the current at the first port based on the battery discharge current value.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

An embodiment of the system may regulate an output port discharge current at a universal serial bus (USB) port in the event of a current sense resistor short circuit or malfunction by determining and using the discharge current of a battery of a circuit. For instance, the system may use, in addition to a first current sense resistor, e.g., positioned at the USB port, a second current sense resistor located on a battery side of a charging circuit. Should the first current sense resistor be damaged or short-circuited, then the first current sense resistor may be unable detect current going to a device connected to USB port. In response, the system and associated methods may use the second current sense resistor and an associated battery discharge current to regulate current originating from the battery side of a circuit and present at the USB port. For instance, a particular embodiment of the system may use the second sense resister on the battery side of the circuit to limit current at the USB port. In one example, the second current sense resistor may be used to control a high short circuit current according to a limit set by an embedded controller.

According to a particular embodiment, a system may include a buck-boost converter that is configured in reverse. The reverse configuration may include an on-the-go (OTG) and voltage at the USB (VBUS) source mode. The first current sense resistor may be used as a reverse output current sense resistor. In the event of a short circuit, the first current sense resistor may control the high short circuit current according to a limit set by the embedded controller.

When configured in reverse mode, all of the current may be provided by the battery. Hence, during a short circuit scenario, because the output current is not limited, the battery discharge current may be high. More particularly, the battery discharge current may be higher than the system peak load current.

According to a particular implementation, the system may automatically monitor the battery discharge current. For instance, at least one of the embedded controller and a battery charger may apply a limit on the discharge current depending on the peak system load. In this manner, the short circuit current may be limited even in the presence of the damaged or short circuited first current sense resistor.

Figure 1:
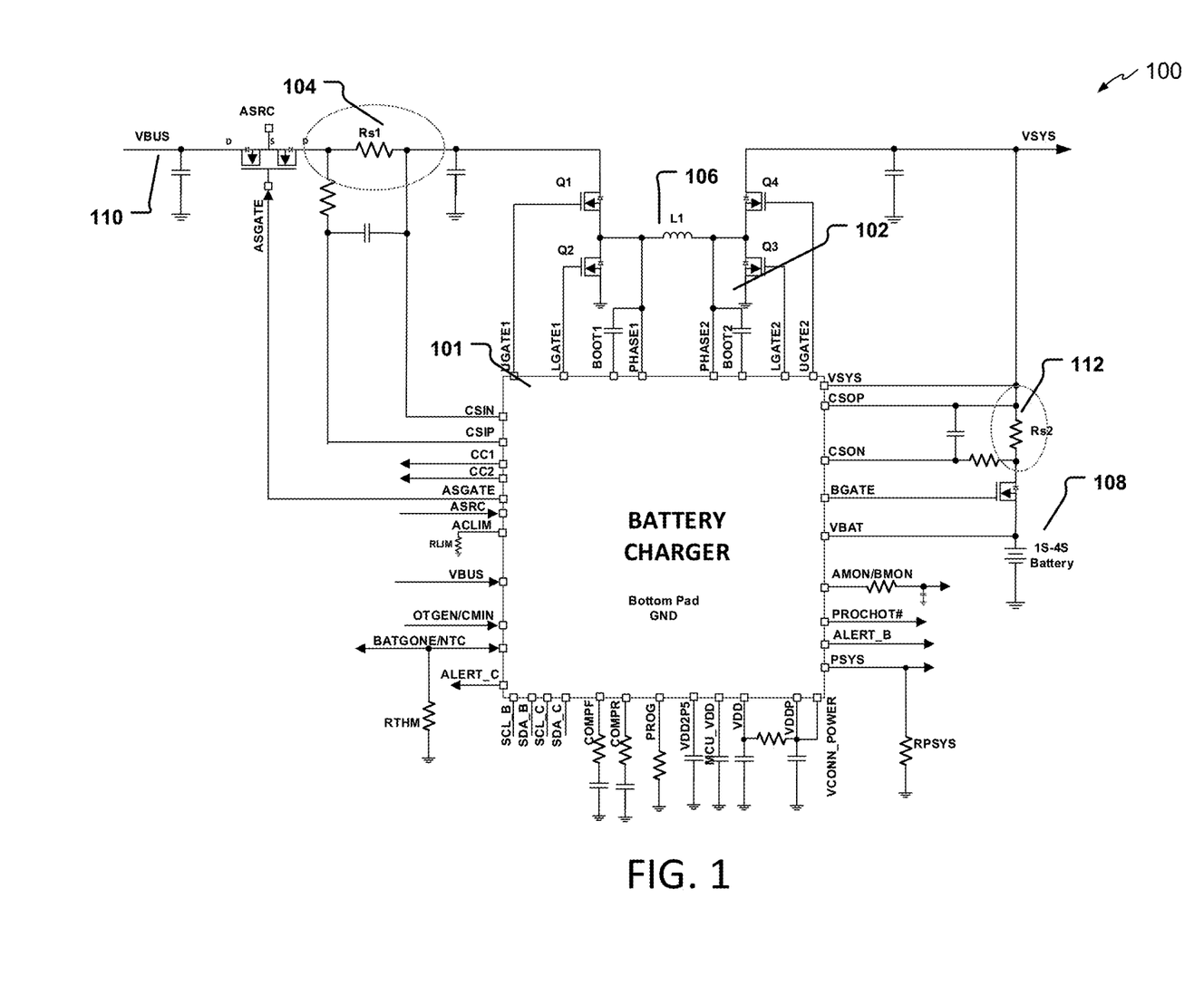
FIG. 1 is a schematic diagram of a system that includes a battery charger coupled to a buck-boost converter, in addition to first and second sense current sense resistors to regulate discharge current.

FIG. 1 is a schematic diagram of a system 100 that includes a battery charger 101 coupled to a buck-boost converter 102, in addition to a first current sense resistor 104 and a second current sense resistor 112 to regulate discharge current. The buck-boost converter is configured in reverse (i.e., OTG/VBUS source) mode. The first current sense resistor (Rs1) 104 may be connected directly to the buck-booster charger 102 and used as a reverse output current sense resistor.

The buck-boost converter 102 may comprise a type of direct current-to-direct current (DC-to-DC) converter that has an output voltage magnitude that is either greater than or less than the input voltage magnitude. The buck-boost converter 102 may produce a range of output voltages, ranging from much larger (e.g., in absolute magnitude) than the input voltage, down to almost zero. The output voltage is of the opposite polarity than the input. The output voltage is adjustable based on the duty cycle of an associated switching transistor.

The operation of the buck-boost converter 102 may be characterized by a reluctance of an inductor 106 of the buck-boost converter 102 to allow rapid change in current. From an initial state in which nothing is charged, and a switch is open, the current through the inductor 106 may be zero. When the switch is first closed, a blocking diode Q3 may prevent current from flowing into the right hand side of the buck-boost converter 102, so it must all flow through the inductor 106. However, since the inductor 106 does not allow rapid current change, the inductor 106 may initially keep the current low by dropping most of the voltage provided by a source. Over time, the inductor 106 may allow the current to slowly increase by decreasing its own resistance. In an ideal circuit, the voltage drop across the inductor 106 may remain constant. When the inherent resistance of wires and other circuitry is taken into account, then the voltage drop across the inductor 106 may also decrease as the current increases. Also during this time, the inductor 106 will store energy in the form of a magnetic field.

Current input may be supplied from a battery 108 on the right hand side of the circuit, and output may be supplied from VBUS source node 110 on left-hand side of the system 100. During normal operation, current may be detected on the first current sense resistor 104. In some cases, the first current sense resistor 104 may explode or experience an open circuit situation. In such a scenario, the circuit operation may fail, but damage to other internal circuitry and connected charging devices may not occur. That is, where the first current sense resistor 104 is alternatively shorted or damaged, a direct connection may result. The damaged first current sense resistor 104 cannot provide current readings the embedded controller or the battery charger 101. A connected device (not shown) may continue to draw current, resulting in a current surge from the battery 108.

Put another way, when the first current sense resistor 104 becomes damaged or short circuited, no output current limit may be present. The unchecked current resulting from absence of the output current limit can cause damage to the buck-boost charger 102 and associated components, as well as to equipment charging at the VBUS source node 110.

According to a particular embodiment of the system 100, short circuit current may be limited by a battery discharge current. That is, in the event of a short circuit, the second current sense resistor (Rs2) 112 of a particular embodiment may control the high short circuit current according to a limit set by the embedded controller and/or battery charger 101. According to a particular implementation, the system 100 may automatically and continuously monitor the current discharged from the battery 108 at using the second current sense resistor 112. The system 100 may apply a limit on the discharge current depending on a peak system load that is known to the embedded controller. In this manner, the short circuit current may be limited even in the presence of the damaged or short circuited first current sense resistor 104.

Figure 2:
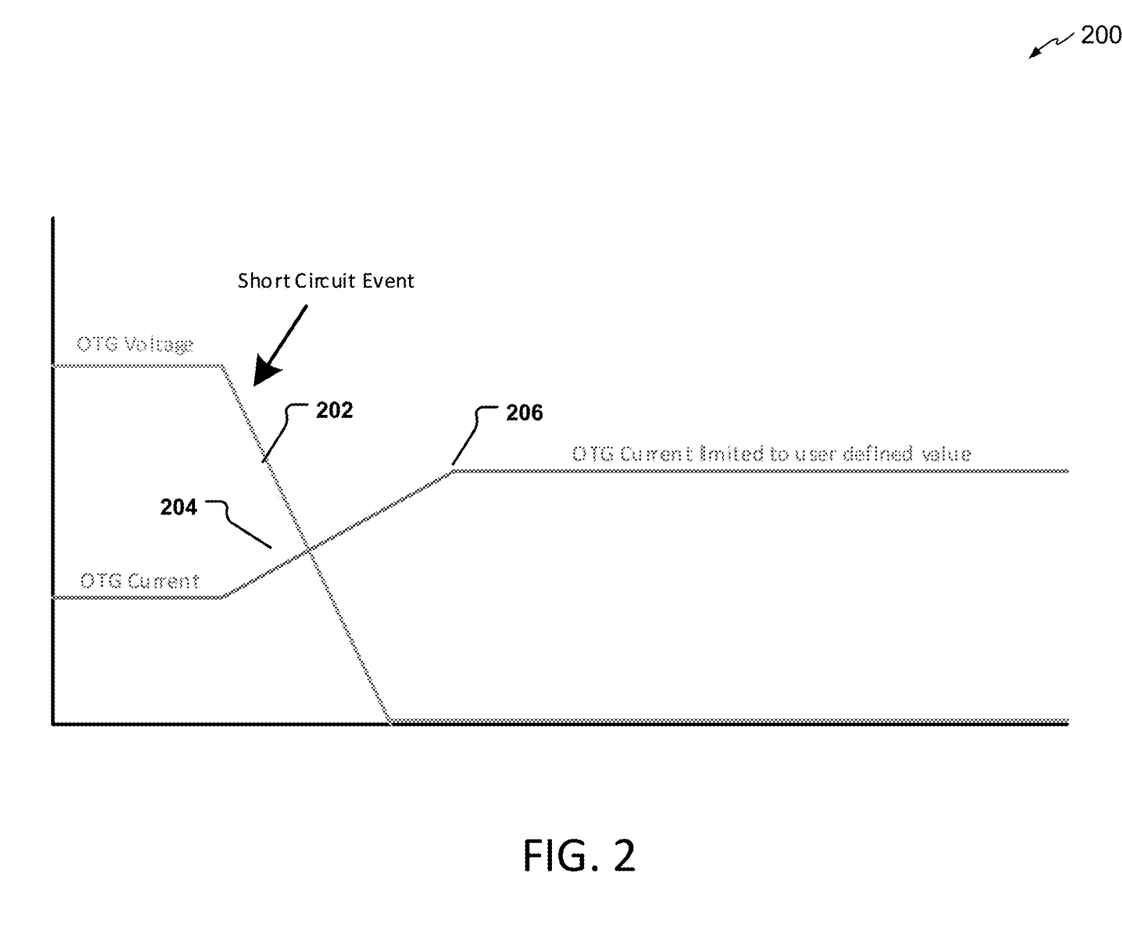
FIG. 2 is a graph showing voltage and current waveforms, respectively, associated with normal operating conditions for a circuit, such as the system of FIG. 1.

FIG. 2 is a graph 200 showing voltage and current waveforms 202, 204, respectively, associated with normal operating conditions for a circuit, such as the system 100 of FIG. 1. In the figure, line 202 displays data associated with an OTG voltage of the circuit. Line 204 is a waveform that tracks data associated with OTG current.

As shown in FIG. 2, a short circuit event occurs that alters the respective trajectories of the waveforms 202, 204. For purposes of the figure, the short circuit event is assumed to be at a component of the circuit other than the first current sense resistor positioned proximate a USB output port, for instance. As such, as the voltage waveform 202 drops in magnitude, and the current waveform 204 climbs, the system may use the first current sense resistor to place a limit on the current at 206. Limiting the current may reduce the possibility of damage to internal and external circuitry.

Figure 3:
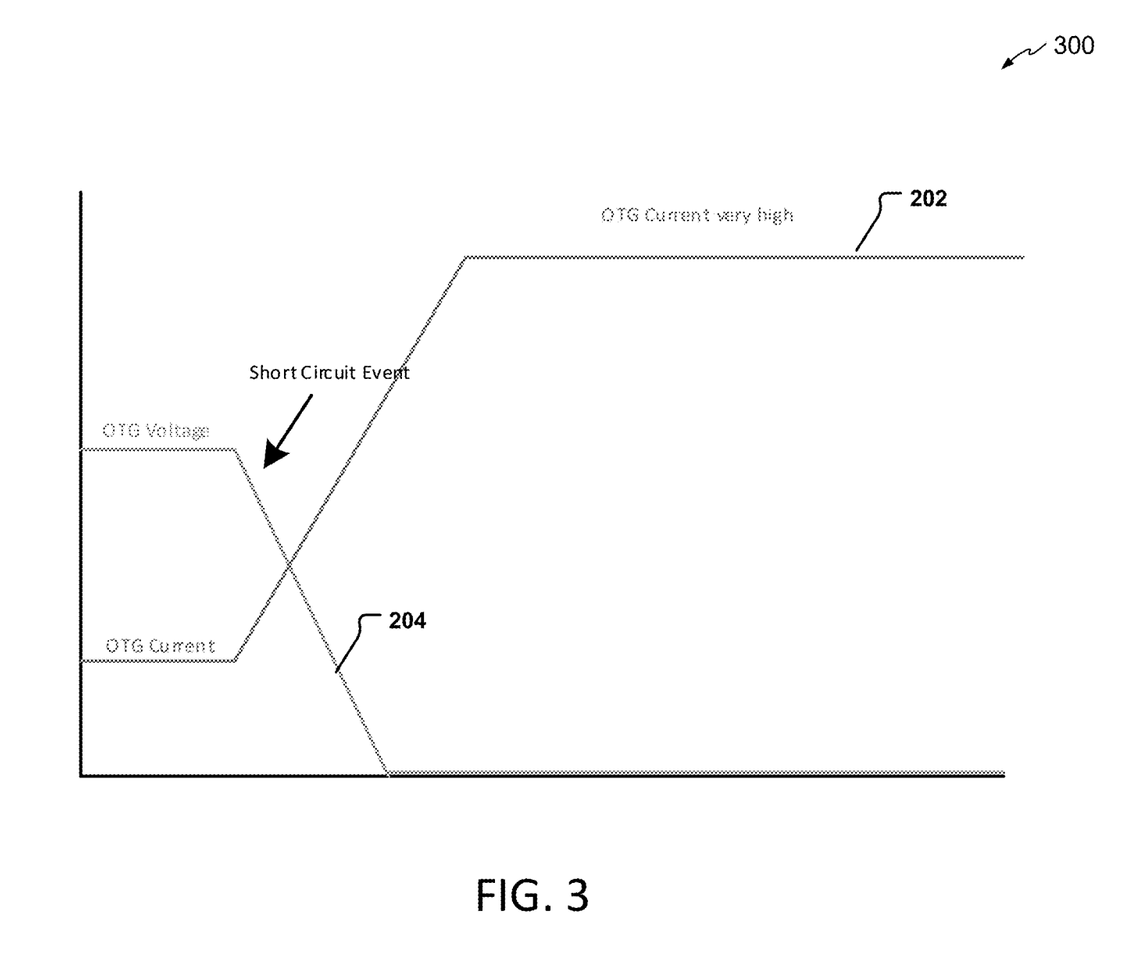
FIG. 3 is a graph showing voltage and current waveforms, respectively, for a circuit, such as the system of FIG. 1, but operating with a damaged or short circuited first current sense resistor.

FIG. 3 is a graph 300 showing voltage and current waveforms 202, 204, respectively, for a circuit, such as the system 100 of FIG. 1, but operating with a damaged or short circuited first current sense resistor. For illustrative purposes, no current control is applied. In the figure, line 202 displays data associated with an OTG voltage of the circuit. Line 204 is a waveform that tracks data associated with OTG current.

As shown in FIG. 3, a short circuit event occurs that affects the respective trajectories of the waveforms 202, 204. For purposes of the figure, the short circuit event is assumed to be at a first current sense resistor positioned proximate a USB output port, for instance. As such, the voltage waveform 202 drops in magnitude, and the current waveform 204 climbs. For illustrative purposes, in the absence of monitoring a second current sense resistor, the current climbs to a level that may harm circuitry internal and external to the system.

Figure 4:
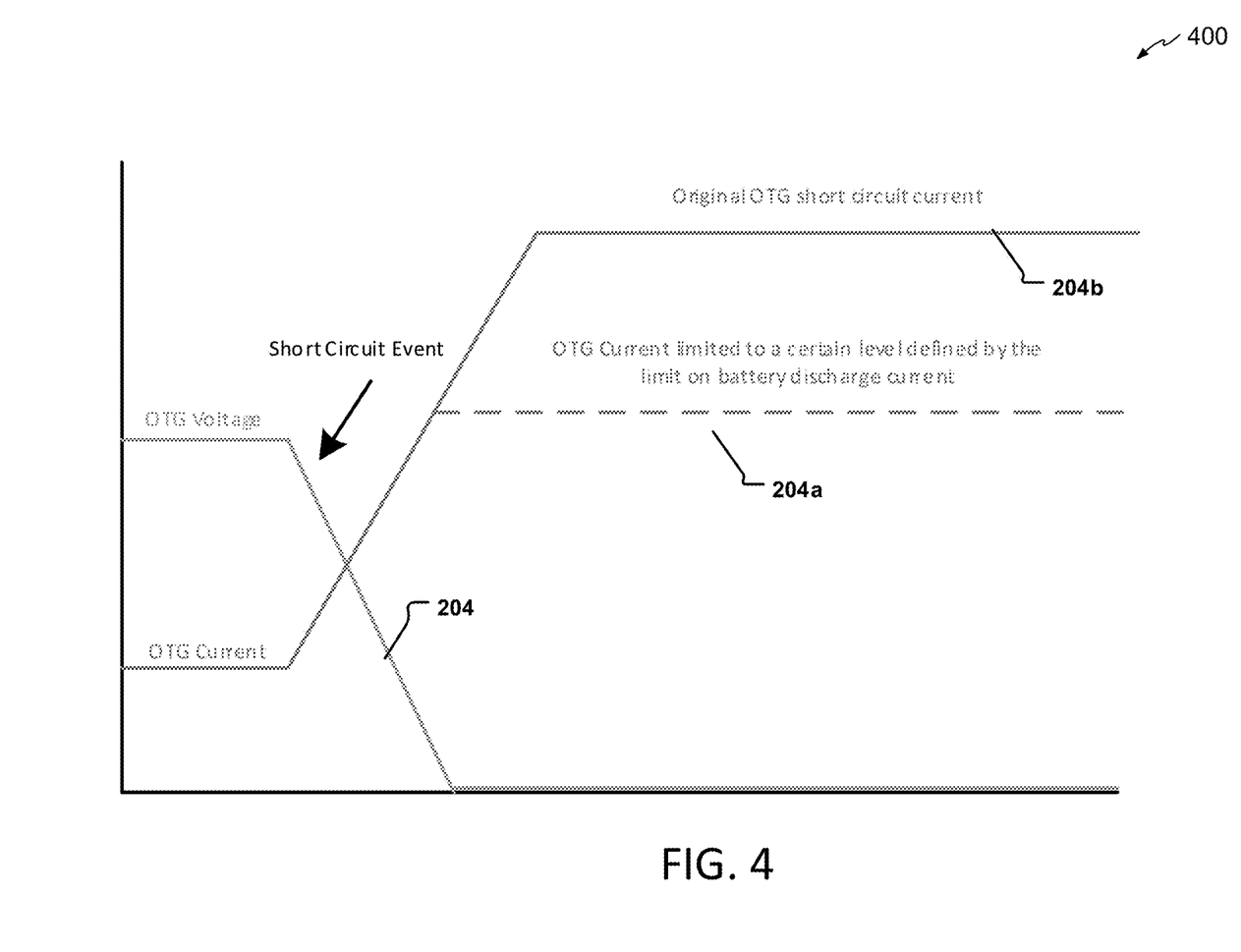
FIG. 4 is a graph showing a voltage waveform, as well as alternative current waveforms for a circuit, such as the system of FIG. 1, having a damaged or short circuited first current sense resistor, where the alternative current waveforms reflect current plots where current is limited using battery discharge current and an associated second current sense resistor, and where current is unchecked.

FIG. 4 is a graph 400 showing a voltage waveform 202, as well as alternative OTG current waveforms 204a and 204b, for a circuit, such as the system 100 of FIG. 1, having a damaged or short circuited first current sense resistor. The alternative OTG current waveforms reflect current plots where current is limited using battery discharge current and an associated second current sense resistor (204a), and where current is unchecked (204b). As explained herein, OTG short circuit current may be limited by a second current sense resistor placed to measure the battery discharge current. In the event of the illustrated short circuit, the second current sense resistor may control the high short circuit current according to a limit set by the embedded controller. According to a particular implementation, the system may automatically monitor the battery discharge current. The system may apply a limit on the discharge current depending on the peak system load. In this manner, the short circuit current may be limited even in the presence of the damaged or short circuited first current sense resistor.

Figure 5:
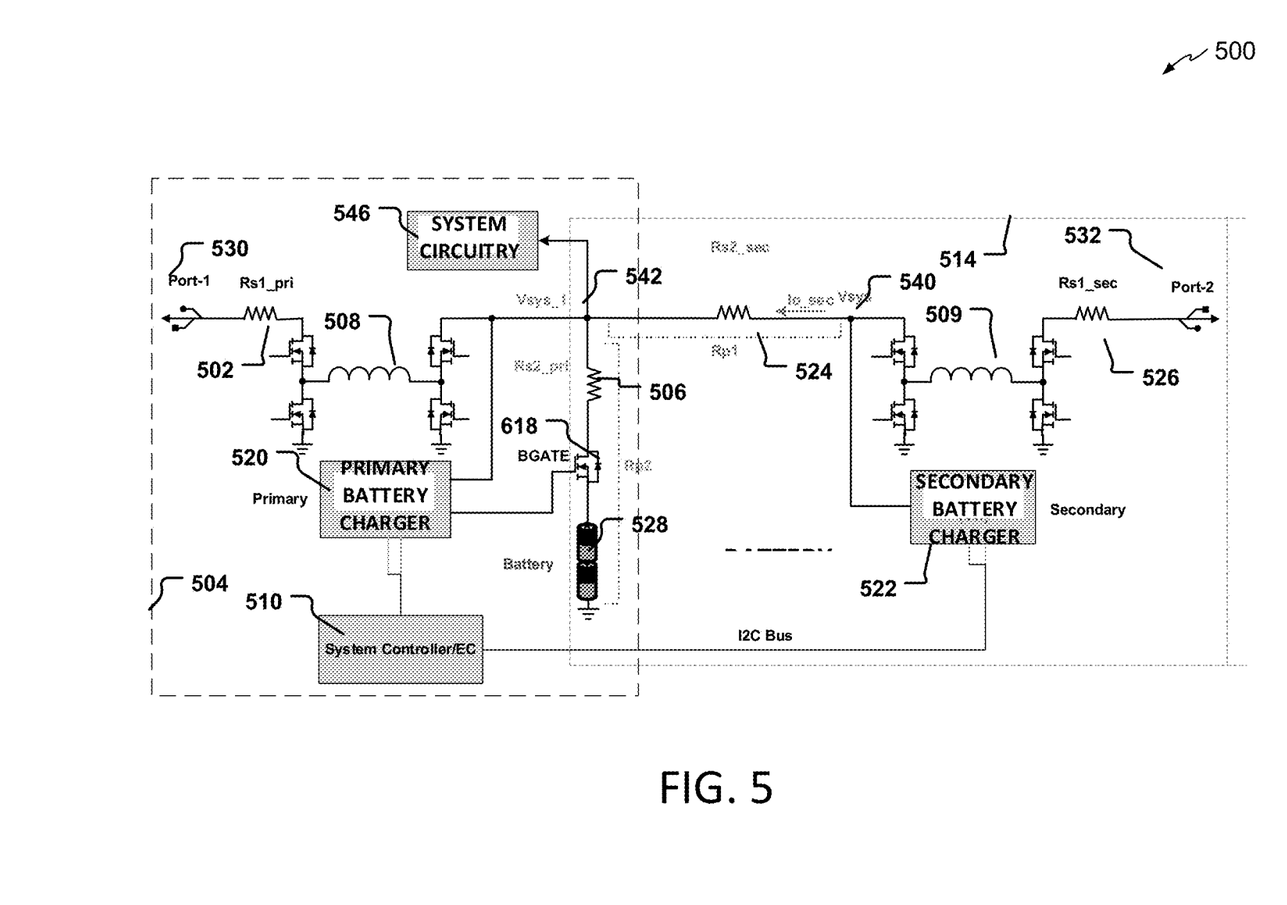
FIG. 5 is a schematic circuit diagram of a dual port battery charger system, which in the presence of a short circuit or damaged first current sense resistor of a first current discharge loop, may use a battery discharge current at a second current sense resistor of the respective discharge loop as a backup to the first current sense resistor.

FIG. 5 is a schematic circuit diagram of a dual port battery charger system 500, which in the presence of a short circuit or damaged first current sense resistor of a first current discharge loop, may use a battery discharge current at a second current sense resistor of the respective discharge loop as a backup to the first current sense resistor. Turning more particularly to the drawing, an embedded controller 510 in a first case may recognize that an external load (not shown) is connected to first port 512 associated with a primary current discharge loop 504. In the presence of a short circuit or damage to a first current sense resistor 502 of the primary loop 504, the system 500 may use a battery discharge current at a second current sense resistor 506 of the primary current discharge loop 504 as a backup to the first current sense resistor 502. In another scenario, the embedded controller 510 may recognize that a second device (not shown) is drawing current at a second port 516 associated with a second current discharge loop 504. In the presence of a short circuit or damage to a first current sense resistor 524 of a secondary loop 514, the system 500 may use a battery discharge current at a second current sense resistor 526 of the secondary current discharge loop 514 as a backup to the first current sense resistor 524 of the secondary loop 514.

In the illustrated implementation of FIG. 5, the system 500 in either case may automatically monitor the battery discharge current. The system 500 may apply a limit on the discharge current depending on the peak system load. In this manner, the short circuit current may be limited even in the presence of a damaged or short circuited first current sense resistor 502, 520.

The system 500 includes a primary buck-boost battery charger 508 and a secondary buck-boost charger 509 coupled respectively to primary and secondary battery chargers 520, 522. The buck-boost battery chargers 520, 522 may be configured in dynamic voltage control (DVC) mode. An embodiment of the system 500 may incorporate a transport layer protocol, such as transmission control protocol (TCP) to anticipate or estimate a current surge. The buck-boost converters 508, 509 may be configured in reverse (OTG/VBUS source) mode. The system 500 may additionally include the first and second current sense resistors 502, 506 on a primary side 504, as well as first and second current sense resistors 524, 526 on the secondary side 514.

Turning particularly to the first illustrative case, the first current sense resistor 502 may be used as a reverse output current sense resistor. In the event of a short circuit, the second current sense resistor 506 may control the high short circuit current according to a limit set by a system embedded controller 510. When configured in reverse mode, all of the current may be provided by a battery 528. Hence, during a short circuit scenario, because the output current at a first port node 530 is not limited, the battery discharge current may be high. More particularly, the battery discharge current may be higher than a system peak load current. Where the current is drawn from the battery 528, and the first current sense resistor 502 is short circuited or damaged, an embodiment of the system 500 may use the battery discharge current at the second current sense resistor 506 as a backup to the first current sense resistor 502.

According to a particular embodiment of the system 500, when one of the first current sense resistors 502, 526 is damaged, the system 500 may use the second current sense resistor 506 to regulate the output current at either the first or second port 532, 534. For instance, in the event of damage to the first current sense resistor 502 on the primary side 504, the second current sense resistor 506 may be used to regulate the current. In one embodiment, the second current sense resistor 506 may thus be used to prevent damage to internal and external circuitry.

The OTG short circuit protection for the primary buck-boost battery charger 520 may be similar to other chargers operating in single port application. For instance, the system 500 may monitor the battery discharge current through the second current sense resistor 506. The current sense resistor may be used by the primary battery charger 520 to monitor both the system load current, as well as the OTG current.

The OTG current of an embodiment may be scaled according to a voltage ratio between the voltage at the battery (VBAT) and the VBUS/OTG voltage. Because the peak system current in an implementation is known by the embedded controller 510, the system 500 may apply a limit to the battery discharge current. Should this limit be reached, the system 500 may operate in the first discharge current limit loop 504. As a result, the very high current due to a short circuit on the side of the universal serial bus (USB) port 530 and shorted or damaged first current sense resistor 502 may be controlled by the embedded controller 510. For example, the current may be limited to an acceptable level that will help protect components in case of a short circuit event.

The system 500 may include the two USB ports 530, 532 that can be used to separately to charge the battery 528. The first current sense resistor 502 is shown connected to the first USB port 530. During normal operation, the first current sense resistor 502 may be used to determine what amount of current is being drawn on the primary side 504. In the course of operations, a short circuit or other unintentional damage may occur in either USB port 530, 532. An embodiment of the system 500 may protect both the primary and the secondary sides and scenarios in individually or in conjunction.

The embedded controller 510 may include hardware and software making it aware of what devices are connected. The embedded controller 510 may set up the primary charger 520, for instance, when a device is connected to the first USB port 530. Accordingly, when a device is connected to the second port 532, the embedded controller 510 may set up the secondary charger 522.

The embedded controller 510 may also be aware of the maximum load of the system 500, as well as what is an expected and acceptable discharge current value. The embedded controller 510 may set a limit based on that, and charger 520, 522 may do the same thing.

According to a particular embodiment, the embedded controller 510 on the motherboard communicates with the battery chargers 520, 522. For example, the embedded controller 510 may regulate the discharge of power from the battery 518 to the port devices. If either one of the first current sense resistors 502, 506 are damaged, the embedded controller 510 may limit the power. This current regulation is useful because the system 510, in the absence of information from the first current sense resistors 502, 506, may lose track of how much actual current is being provided.

As explained herein, the embedded controller 510 may be aware of which port 530, 532 is connected to which kind of device, and how much current the device can draw. The embedded controller 510 and/or a battery charger 520, 522 may set a constant current digital/analog converter (CCDAC) value to help regulate the current. In one respect, the CCDAC is a value set to limit or otherwise regulate the battery discharge current. When there is a global first current sense resistor, the system 500 may set the OTG current limit. In this manner, the system 500 may use the battery 518 to limit the discharge current across the first current sense resistor.

As configured in FIG. 5, the second current sense resistor 526 of the secondary side 514 of the circuit may be used to detect current flowing from the secondary buck-boost converter 509 and battery charger 522 to the port 532. This current may comprise the current between a Vsys node 540 to a Vsys_1 node 542. With this determined current, the system (e.g., the embedded controller 510) may compensate the voltage drop across the system load. In this manner, the system 500 may indirectly regulate the voltage at the Vsys_1 node 542.

Once the system 500 has regulated the voltage at the Vsys_1 node 542, the system 500 may have regulated the charge current. In this manner, the voltage difference between the Vsys_1 node 542 and the voltage at the battery (VBAT) may be used to generate the charge current.

Figure 6:
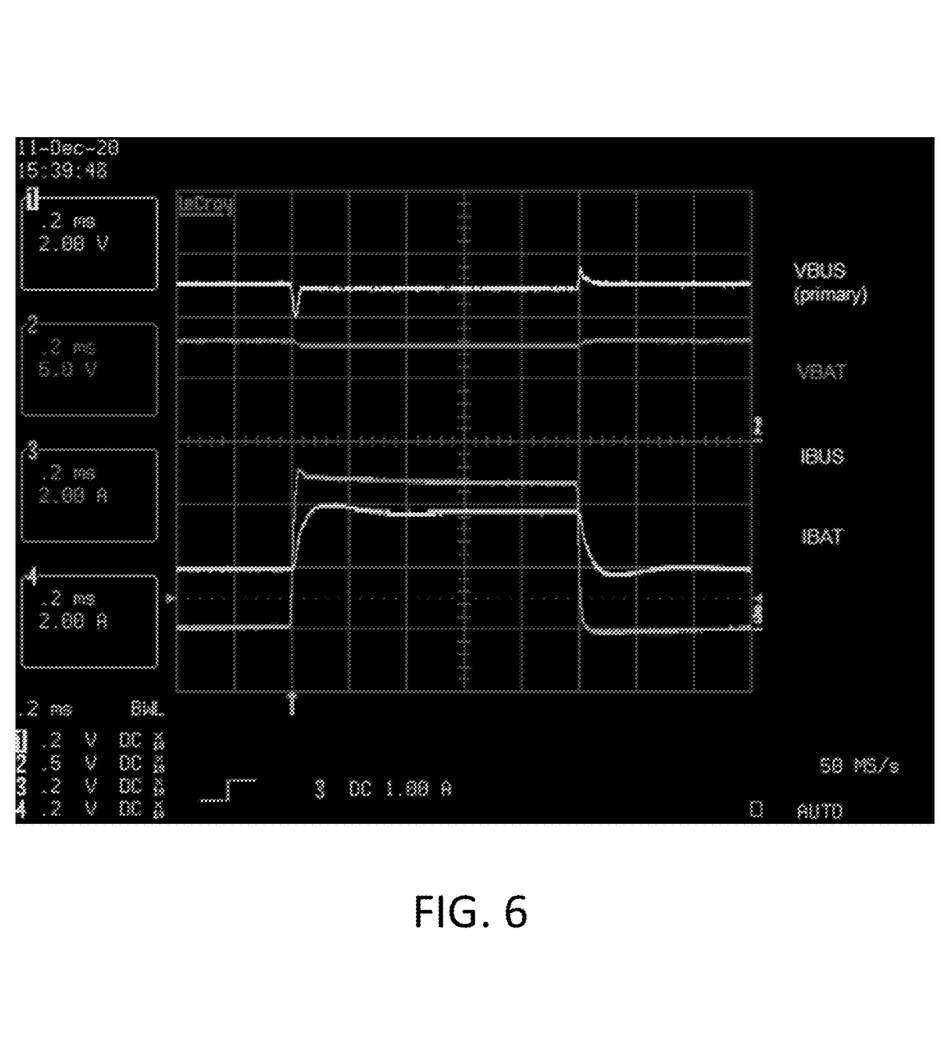
FIG. 6 shows a graph of waveforms comprising electrical readout values (i.e., voltage and current) measured over time at various components of a circuit in the case of a single port operating scenario at a primary charger.

FIG. 6 shows a graph 600 of waveforms comprising electrical readout values (i.e., voltage and current) measured over time at various components of a circuit in the case of a single port operating scenario at a primary charger. The circuit may be similar or identical to the system 500 of FIG. 5. In this first scenario, the system is operating in either a single port implementation or damage has occurred at the first current sense resistor rs1 on the primary side. A load is applied to the VBUS node of the primary charger in a dual port implementation with the discharge current loop disabled.

With reference to the system 500 of FIG. 5, the values tracked in the graph 600 of FIG. 6 may include: the voltage at the battery 518 (VBAT), the voltage at the bus (OTG/UV/OV disabled), the first current sense resistor 502 (RS1) shorted, the CCDAC value, the current at (ISYS), and the current at the load 530. The CCDAC value may be set by logic in the system (e.g., the embedded controller 510 or a charger 520, 522) to limit or regulate current in the event of a current sense resistor short circuit or damage scenario. IBUS may include the discharge current at port 1 530 where the system 500 is attempting to limit or otherwise regulate current. VBUS may be a voltage waveform (yellow) at the USB port 1 node 530. VBUS may comprise the battery voltage. As shown in the waveforms of FIG. 6, The values of each may include: VBAT=8.4V, VBUS=5V (OTG), UV/OV disabled, RS1 shorted, CCDAC=0 A, ISYS=2 A, Load=0.1 A~5 A.

In the scenario where Rs1 is shorted, the constant current digital/analog converter (CCDAC) value is zero. Because the CCDAC is zero, there is no limitation on the discharge current. As a consequence, IBUS (blue) rises to around five amps, which can damage circuitry.

Figure 7:
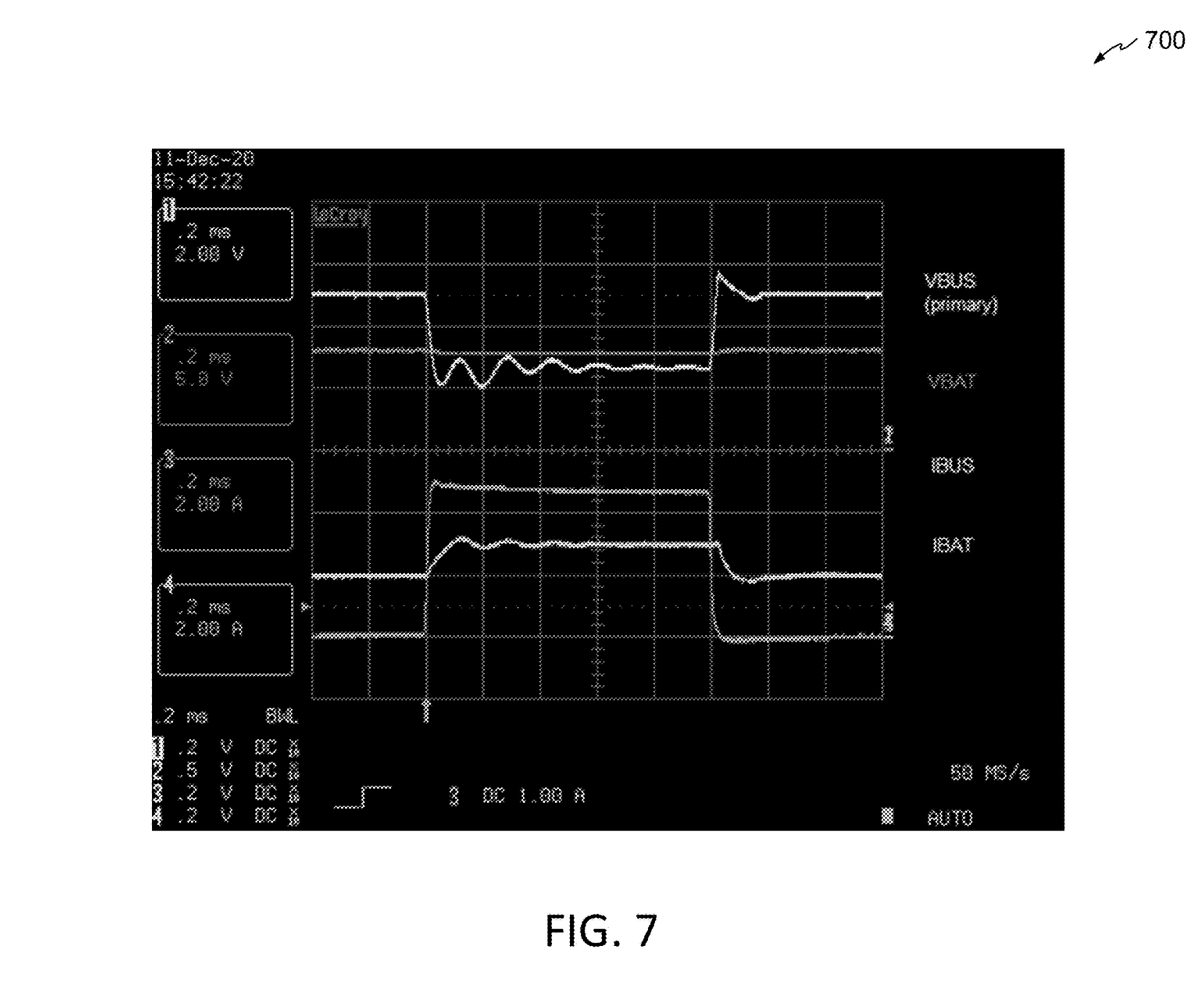
FIG. 7 shows a graph of waveforms comprising electrical readout values measured over time at various components of a circuit when the load applied to a bus of primary charger in a dual port implementation with a discharge current loop enabled.

FIG. 7 shows a graph 700 of waveforms comprising electrical readout values (i.e., voltage and current) measured over time at various components of a circuit when the load applied to VBUS of primary charger in a dual port implementation with a discharge current loop enabled. The circuit generating the waveforms may be similar or identical to the system 500 of FIG. 5, and the readouts of the waveforms of the graph 600 of FIG. 6. In contrast to the disabled loop scenario of FIG. 6, the CCDAC of the enabled loop scenario in FIG. 7 has been raised to 1.5 amps. In changing the constant current digital/analog converter (CCDAC) value, the system 500 essentially limits the discharge current from the battery to a value that is approximately twice that of the CCDAC value. In the specific example of FIG. 7, the IBAT discharge current is limited to three amps (down from five amps), and consequently, the VBUS voltage drops.

Figure 8:
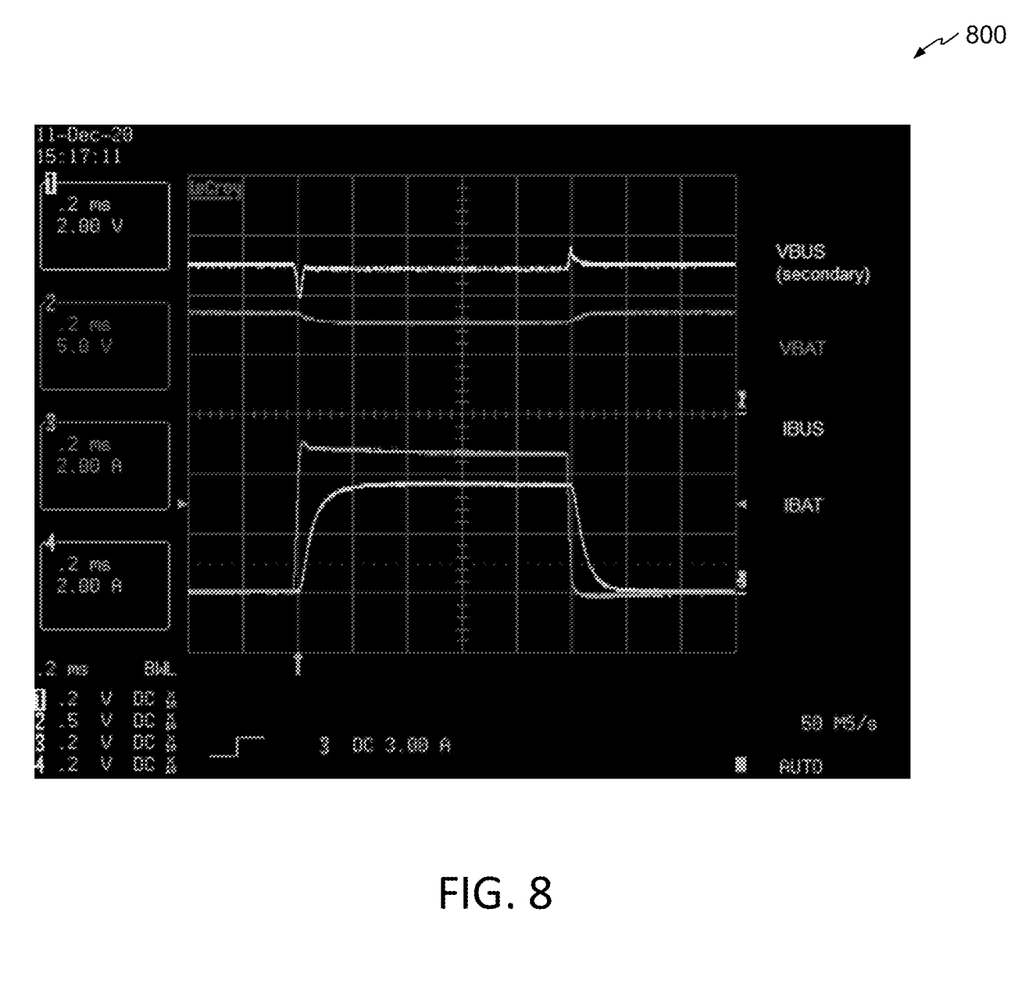
FIG. 8 show waveforms for values in a second case scenario where a short circuit has occurred at the current sense resistor on a secondary side when a secondary charger operates in a dual port implementation and in dynamic voltage control (DVC) mode.
Figure 9:
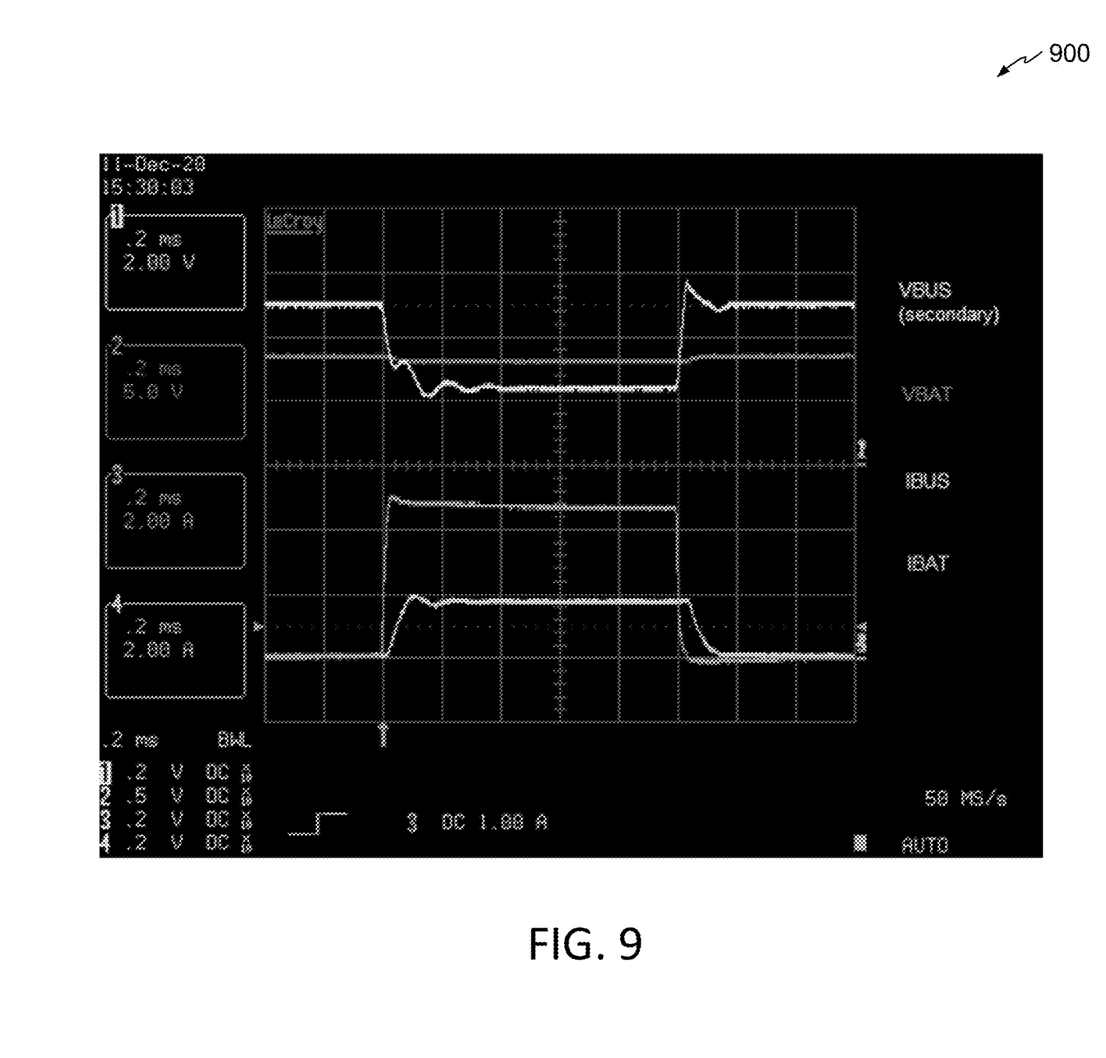
FIG. 9 shows a graph of waveforms comprising electrical readout values (i.e., voltage and current) measured over time at various components of a circuit where a load is applied to a bus of secondary charger in a dual port implementation with a discharge current loop enabled and a constant current digital/analog converter (CCDAC) value has been to protect the battery from over discharging and protect vulnerable components.

FIGS. 8 and 9 show waveforms for values in a second case scenario where a short circuit has occurred at the current sense resistor on the secondary side. More particularly, FIG. 8 shows a graph 800 of waveforms comprising electrical readout values (i.e., voltage and current) measured over time at various components of a circuit when a secondary charger operates in a dual port implementation in DVC mode. The circuit generating the waveforms may be similar or identical to the system 500 of FIG. 5, and the readouts of the waveforms of the graphs 600, 700 of FIGS. 6 and 7.

With reference to the illustrative example of FIG. 5, a load may be applied to VBUS of the secondary charger 522 with the discharge current loop 514 disabled. The current through the current sense resistor 506 may now comprise the scaled OTG current. Ideally, the OTG output current would be directly controlled by setting a limit on the discharge current. But with the current discharge loop 514 disabled, short circuit current in case of a damaged or shorted first current sense resistor 524 is not being limited to protect circuit components. Readout waveform values in the example of FIG. 8 may include VBAT=8.4V, VBUS=5V (OTG), UV/OV disabled, RS1 shorted, CCDAC=0 A, ISYS=0 A, Load=0.1 A~5 A. Because CCDAC is zero, no current limitation is in place, and the discharge current IBAT goes from zero to almost four amps. In this scenario, four amps is undesirable and may harm circuitry.

FIG. 9 shows a graph 900 of waveforms comprising electrical readout values (i.e., voltage and current) measured over time at various components of a circuit where a load is applied to VBUS of secondary charger in a dual port implementation with the discharge current loop enabled. Notably, the CCDAC has been raised to 0.9 amps to protect the battery from over discharging and protect vulnerable components. The IBAT discharge current is thus limited to 1.8 A (double the CCDAC value), and consequently, the VBUS voltage drops. The values of the waveforms in FIG. 9 may include: VBAT=8.4V, VBUS=5V (OTG), UV/OV disabled, RS1 shorted, CCDAC=0.9 A (effectively creating a 1.8 A limit), ISYS=0 A, Load=0.1 A~5 A. Thus, IBAT has been limited from 4 amps to 1.8 amps. VBUS in FIG. 9 corresponds to the voltage at the secondary port node 532 of FIG. 5.

Figure 10:
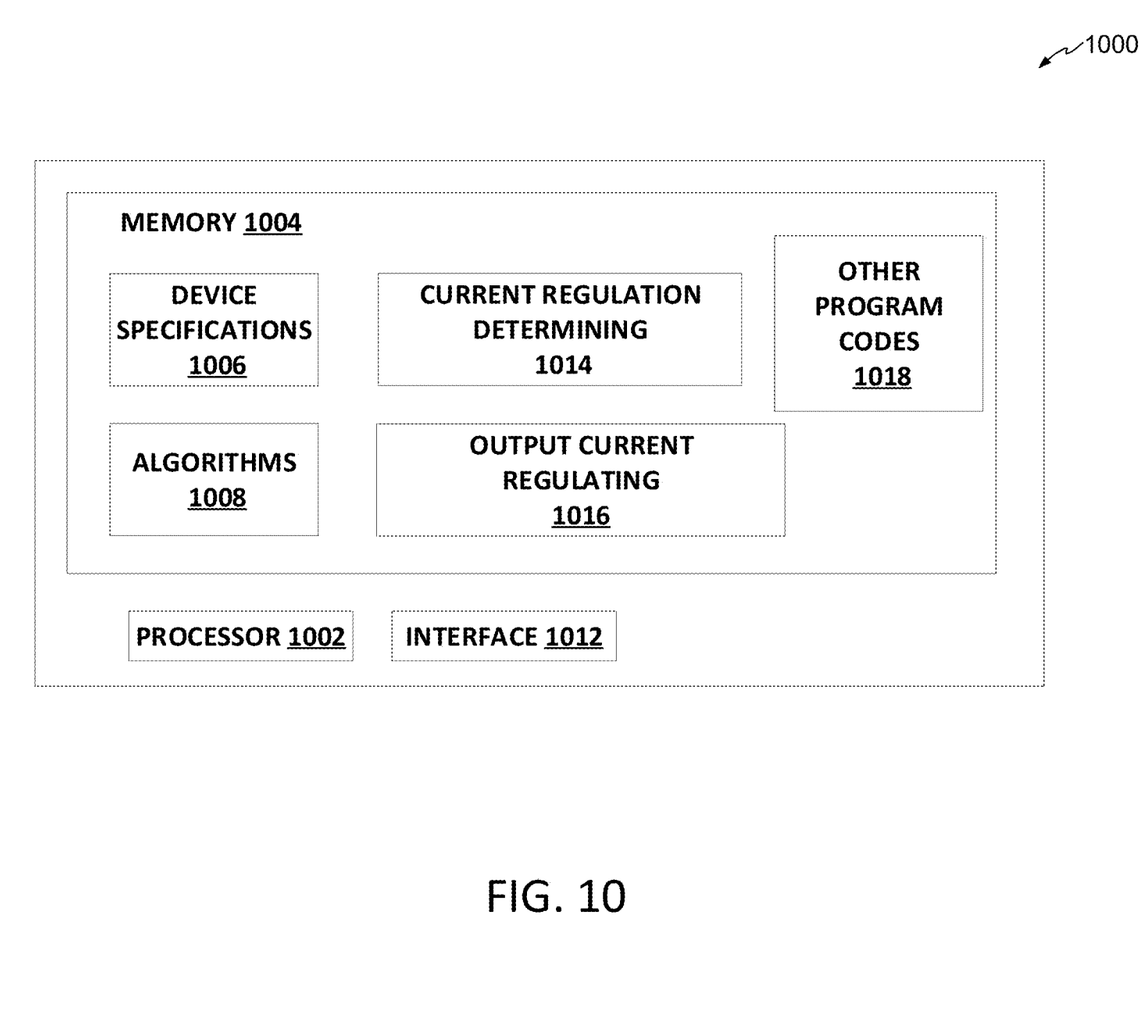
FIG. 10 is a block diagram of a computing module, or apparatus, such as may be included in the systems of FIGS. 1 and 5, the computing module configured to regulate current output of a battery charging system.

FIG. 10 is a block diagram of a computing module, or apparatus, such as may be included in in the systems of FIGS. 1 and 5, the computing module configured to regulate current output of a battery charging system.

The system 1000 may include a processor 1002 and a memory 1004. The processor 1002 may access program code stored within the memory 1004, such as algorithms 1008 and the various other programmatic modules and functions described herein. The system 1000 may in some embodiments comprise an embedded controller or battery charger, such as the embedded controller 510 and battery chargers 520, 522 shown in the system 500 of FIG. 5.

The memory 1004 of the system 1000 may store current limits 1006 for various device and circuitry components. The current limits 1006 may be used by the system 1000 to set output current limits to protect circuitry during normal operation. The memory 1004 of the system 1000 may additionally include a module 1010 for continuously monitoring current value, such as at the current sense resistors. To this end, the system may include an interface 1012 for receiving and sending data and instruction.

According to a particular embodiment, the memory 1004 of the system 1000 may include a module 1114 for determining an output limit current based on a detected battery discharge current. Another module 1016 may implement the determined output current limit using a battery or battery charger. The memory 1004 may include additional program code 1018 for executing various other processes described herein.

Figure 11:
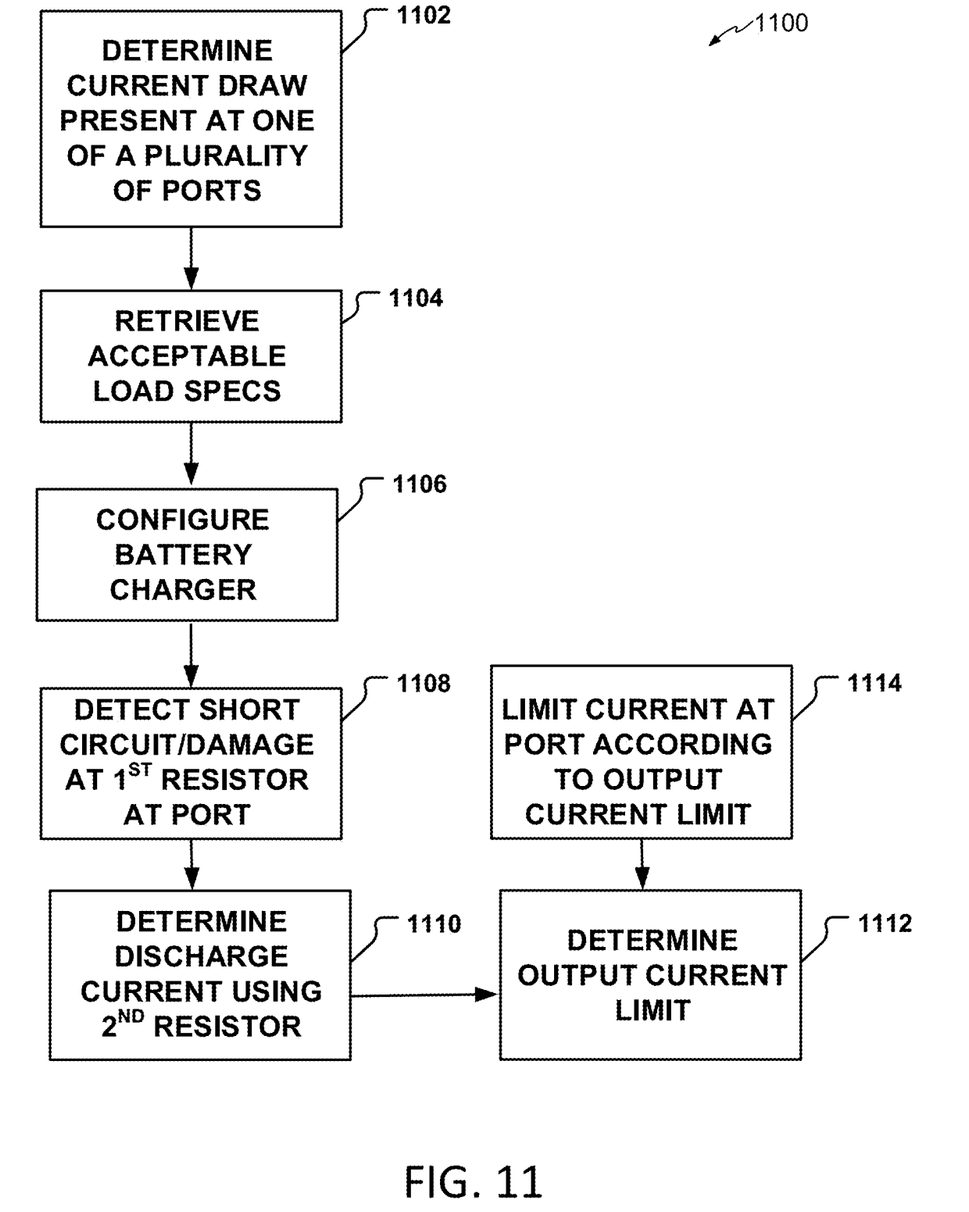
FIG. 11 is a flowchart of an embodiment of a method of regulating an output port discharge current at a USB port in the event of a current sense resistor short circuit or malfunction using a battery discharge current.

FIG. 11 is a flowchart comprising an embodiment of a method 1100 that may be executed by at least one of hardware, firmware, and software, such as the type that are illustrated in FIGS. 1, 5, and 10, among others.

Turning more particularly to the drawing, an embodiment of the method 1100 may include determining a current draw that is present at one more USB ports. For instance, an embedded controller may be aware of which devices are connected to which ports, and what voltages and currents are associated with their operation.

At 1114, the system may retrieve acceptable load and current specifications for the battery charging circuit, as well as for any devices connected to the ports. Based on the specifications and connections, the system may at 1106 configured one of more battery chargers. For instance, the embedded controller my send instructions and activate a current loop including a battery charger in response to a device being connected to a port associated with the battery charger.

The system at 1108 may detect a short circuited or damaged current sense resistor. For example, the system may determine that a first current sense resistor in a first loop has short circuited.

In response to the resistor malfunction, the system at 1110 may determine battery discharge current using a second resistor. The system at 1112 may use the determined battery discharge current to determine an output current limit. The output current limit may be associated with a safe operating threshold for internal and external circuitry. In a particular embodiment, the embedded controller may communicate the output current limit to the battery charger.

At 1114, the system may limit or otherwise regulate the current at the port according to the output current limit. For example, the battery charger or embedded controller may apply the output current limit to restrict the current from crossing a current threshold.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A method of regulating current within a battery charging circuit, the method comprising:

positioning a first current sense resistor within a battery charging circuit, wherein the first current sense resistor is configured to sense a first current value at a first port;

positioning a second current sense resistor within the battery charging circuit, wherein the second current sense resistor is configured to sense a battery discharge current value output from a battery;

in response to a short circuit or malfunction at the first current sense resistor, using the battery discharge current value to determine an output current limit; and limiting the first current at the first port according to the output current limit.

2. The method of claim 1, wherein using the battery discharge current value to determine the output current limit further comprises using the battery discharge current to determine the first current value at the first port.

3. The method of claim 1, further comprising using a first battery charger in series with the first current sense resistor to apply the current output limit at the first port.

4. The method of claim 3, further comprising connecting a first buck-boost converter to the first battery charger.

5. The method of claim 4, wherein the first buck-boost converter operates in reverse mode.

6. The method of claim 1, further comprising detecting the short circuit or malfunction at the first current sense resistor.

7. The method of claim 1, further comprising configuring the first current sense resistor to operate as a reverse output current sense resistor.

8. The method of claim 1, wherein the first port is one of a plurality of ports, further comprising determining that an external device has been connected at the first port.

9. The method of claim 8, further comprising sending instructions from an embedded controller to a first battery charger that is associated with the first port, wherein the first battery charger is one of a plurality of battery chargers each associated with at least one respective port in the circuit.

10. The method of claim 1, further comprising continuously monitoring the battery discharge current value at the second current sense resistor.

11. The method of claim 1, wherein limiting the current at the first port according to the output current limit further comprises setting a constant current digital/analog converter (CCDAC) value to regulate the current at the first port.

12. An apparatus comprising:

a first current sense resistor configured to sense a first current value at a first port;

a second current sense resistor configured to sense a battery discharge current value output from a battery; and a processor configured to, in response to a short circuit or malfunction at the first current sense resistor, use the battery discharge current value to determine an output current limit and to limit the current at the first port according to the output current limit.

13. The apparatus of claim 12, wherein the processor is further configured to use the battery discharge current to determine the first current value at the first port.

14. The apparatus of claim 12, wherein the battery discharge current value is continuously monitored at the second current sense resistor.

15. The apparatus of claim 12, wherein the processor is further configured to use the battery discharge current to determine the first current value at the first port.

16. The apparatus of claim 12, wherein the first battery charger is in electrical communication with the second current sense resistor.

17. The apparatus of claim 12, wherein the first current sense resistor operates as a reverse output current sense resistor.

18. The apparatus of claim 12, wherein the processor is further configured to send instructions to a first battery charger that is associated with the first port, wherein the first battery charger is one of a plurality of battery chargers each associated with at least one respective port in the circuit.

19. The apparatus of claim 12, wherein the processor is further configured to limit the current at the first port by setting a constant current digital/analog converter (CCDAC) value to regulate the current at the first port.

20. A non-transitory computer-readable medium comprising instruction for controlling an apparatus having a first current sense resistor configured to sense a first current value at a first portion and a second current sense resistor configured to sense a battery discharge current value output from a battery, wherein the instruction, in response to execution by a processor, causes the processor to perform the following operations:

in response to a short circuit or malfunction at the first current sense resistor, use the battery discharge current to determine an output current limit; and limit the current at the first port according to the output current limit.

\* \* \* \* \*